United States Patent
Mathea et al.

(10) Patent No.: US 7,777,939 B2
(45) Date of Patent: Aug. 17, 2010

(54) METHOD OF MANUFACTURING ELECTROPHORETIC DISPLAY HAVING ORGANIC THIN FILM TRANSISTOR CONTROL CIRCUIT AND ELECTROPHORETIC DISPLAY MANUFACTURED USING THE METHOD

(75) Inventors: Arthur Mathea, Berlin (DE); Marcus Schaedig, Konigs Wusterhausen (DE)

(73) Assignee: Samsung Mobile Display Co., Ltd., Yongin-si (KR)

( * ) Notice: Subject to any disclaimer, the term of this patent is extended or adjusted under 35 U.S.C. 154(b) by 0 days.

(21) Appl. No.: 12/038,614

(22) Filed: Feb. 27, 2008

(65) Prior Publication Data
US 2008/0204848 A1    Aug. 28, 2008

(30) Foreign Application Priority Data

Feb. 28, 2007    (DE) .................. 10 2007 010 712
Feb. 25, 2008    (KR) .................. 10-2008-0016985

(51) Int. Cl.
G02B 26/00    (2006.01)
G09G 3/34     (2006.01)

(52) U.S. Cl. .................... 359/296; 345/107
(58) Field of Classification Search ................ 359/296; 345/107; 430/32; 204/600
See application file for complete search history.

(56) References Cited

U.S. PATENT DOCUMENTS 6,312,304 B1    11/2001    Duthaler et al.
6,778,312 B2    8/2004    Kawai
2008/0012821 A1*    1/2008    Lee et al. .................... 345/107

FOREIGN PATENT DOCUMENTS

| KR | 1020050003257 A | 1/2005 |
| KR | 10-2006-0059171 | 6/2006 |
| KR | 10-2006-0077700 | 7/2006 |
| KR | 10-2006-0078319 | 7/2006 |
| KR | 1020070004460 A | 1/2007 |
| KR | 1020070021567 A | 2/2007 |

OTHER PUBLICATIONS

Office action dated Aug. 7, 2007 for corresponding German Patent Application No. 10 2007 010 712.0, indicating the relevance of the cited references.
KIPO Office action dated Mar. 25, 2009, for priority Korean application 10-2008-0016985 noting references listed in this IDS.
KIPO Office action dated Oct. 8, 2009, for priority Korean application 10-2008-0016985, noting listed reference in this IDS.
KIPO Office action dated Mar. 23, 2010, for priority Korean application 10-2008-0016985, noting listed references in this IDS.

* cited by examiner

*Primary Examiner*—William C Choi
(74) *Attorney, Agent, or Firm*—Christie, Parker & Hale, LLP

(57) ABSTRACT

A method of an electrophoretic display (EPD) having an organic thin film transistor thin film (OTFT) control circuit. The method includes: providing an EPD module including a plurality of EPD units on a common substrate, wherein each of the EPD units includes a cell having optical characteristic (or performance) that can be capacitively switched; coating a plurality of pixel electrodes on a side of the EPD module; and preparing the OTFT control circuit by directly coating a plurality of OTFT layers on the side of the EPD module supporting the pixel electrodes.

14 Claims, 2 Drawing Sheets

METHOD OF MANUFACTURING ELECTROPHORETIC DISPLAY HAVING ORGANIC THIN FILM TRANSISTOR CONTROL CIRCUIT AND ELECTROPHORETIC DISPLAY MANUFACTURED USING THE METHOD

CROSS-REFERENCE TO RELATED PATENT APPLICATIONS

This application claims priority to and the benefit of German Patent Application No. 102007010712.0, filed on Feb. 28, 2007 in the German Patent and Trade Mark Office, and Korean Patent Application No. 10-2008-0016985, filed on Feb. 25, 2008 in the Korean Patent Office, the entire contents of which are incorporated herein by reference.

BACKGROUND OF THE INVENTION

1. Field of the Invention

The present invention relates to a method of manufacturing electrophoretic display (EPD) having an organic thin film transistor (OTFT) control circuit and an EPD manufactured using the method.

2. Description of the Related Art

An electrophoretic display (EPD) is a new type of reflective display, whose image formation mechanism relies on the alternating arrangement of charged coloured particles or fluids in a dispersion or multiphase system by applying an electric field. Examples of EPDs include particle systems of E-Ink and Sipix, "Liquid Powder" of Bridgestone, and "Electrowetting" of Liquavista. These EPDs are all capacitively controlled, i.e., they include a cell that can be capacitively switchable in the optical characteristic (or performance) of the cell. For capacitively switching, a pixel electrode is assigned to each of the cells. When applying a voltage to the pixel electrode, the optical characteristic (or performance) of one or multiple cells can be affected. To describe such operations, an EPD having a particle system will be described in more detail. However, the present invention is not thereby limited, and can be directed to all capacitively switchable EPDS.

An EPD includes a plurality of single EPD units. The EPD unit includes at least one cell filled with charged particles dispersed in a suitable solvent in terms of simplicity of design. For capacitively switching, at least one pixel electrode is assigned to each cell, wherein the pixel electrode is designed and arranged so that charged particles are aligned in the direction of an electric field when applying a voltage to the cell. Likewise, the switching mechanism is capacitive, and the charged particles move in the direction of the pixel electrode and attach thereto in the presence of an electric field. When the accumulated coating is conditioned, it is substantially not transparent to light. In contrast, the dispersion with freely distributed particles allows light to transmit. This realisable technology allows the production of highly flexible displays, such as electronic newspapers. In addition, this technology can be applied to an image forming component in a plurality of electronic products, for example, laptops or mobile phones.

In one embodiment, the plurality of EPD units of the EPD are arranged on a common substrate. Such component of the EPD is referred to as an EPD module. The pixel electrode is applied to the EPD module. To control the operation of the plurality of EPD units of the EPD module, a complex control circuit needs to be provided.

Small-sized EPDs can be controlled via a passive matrix (PM) scheme. That is, a particular pixel can be accessed by applying a voltage to a particular electrode (or conductor) arranged in a row and a particular electrode (or conductor) arranged in a column. For large-sized displays, this PM scheme is not suitable.

In large-sized displays, an active matrix (AM) scheme is used. Here, each pixel is individually addressed to, e.g., transmit light or not transmit light via at least one switch. Likewise, each single pixel includes an active amplifier, for example, in the form of a thin film transistor (TFT). The amplifier which is assigned to each pixel has two important functions. That is, the control voltage of a pixel decreases with increasing number of the rows and columns of a pixel matrix being used (which limit the size of a device driven by the PM scheme). However, the amplifier can increase this voltage to the value required for switching the pixel (or cell). But, the continuous increase of the number of columns and rows and reduction of the size of pixels lead to an increase of the parasitic capacities of the pixel. To reach the high frame rate which is often necessary, the capacity should not induce reduction of the switching speed. A local amplifier with separate power supply can allow for the fast switching with short powerful current pulses.

By virtue of the discovery and development of organic semiconductor materials, organic thin film transistors (OTFT) have been spotlighted for the development of miniaturised electronic components. An OTFT includes a conductive gate electrode. The conductive gate electrode is covered with a thin dielectric film to which an active organic semiconductor material is attached. Normally, minor molecules and oligomers such as pentacene and polythiophene are used as a semiconductor material. The semiconductor layer has a thickness of several tens of nm and is laterally limited by the source and drain electrodes. Longitudinally, the semiconductor layer has a size of several hundreds of nm. Ideally, the organic semiconductor material is available as a monocrystal, but polycrystalline or amorphous films can also be used due to their significantly cost-effective production.

The production of OTFTs can be very cost-effective, e.g. in term of already existing technologies to produce synthetic micro structures, e.g., suitable inkjet printing technologies. That is, the OTFTs can be manufactured by utilizing injet printing to produce organic semiconductor layers. The ink is selectively applied to a definite area of the substrate, and the ink is composed of the organic semiconductor (or the organic semiconductor is contained in the ink). According to an embodiment of the present invention, the pixel electrodes and the OTFT layers are applied to an EPD module. That is, in one embodiment, the EPD module and the OTFT module including pixel electrodes are laminated together.

In addition, EPD modules are commercially available from different manufacturers. To produce the EPD modules that can directly operate, the EPD module needs to include a control circuit suited to a pixel electrode, in particular an OTFT control circuit. To this extent, an embodiment of the present invention uses an OTFT module, which is connected to the EPD module having applied pixel electrodes by using a laminating method. The OTFT module includes a plurality of OTFT units, which are arranged on a common substrate. Here, both modules have to be mutually aligned. By arranging both modules in such a way, the pixel electrodes are electrically connected desirably to establish a plurality of EPD units, thereby establishing the OTFT units controlling the operation of the plurality of EPDs. This requires structure which supports a proper mutual alignment of the modules. The creation of such structures as well as the process of aligning both modules increase manufacturing costs and are error-prone which can increase defects.

When manufacturing the OTFT control circuit on a separate substrate film, more problems occur as follows:

(1) During the process, there are always some temperature steps which lead to an uncontrollable deformation and expansion of the substrate film. This slightly deformed film can then be combined with the EPD module only imprecisely, i.e., yield, quality and reproducibility of the manufacturing process are reduced.

(2) When laminating the EPD module with the OTFT module, additional pressure is required. This pressure can damage the sensitive transistors.

In addition, laminating generally involves application of an adhesive agent between the modules as well as a thermal treatment for hardening of the adhesive agent. These laminating measures are linked with material costs and extra processes and can result in further defect which might increase manufacturing defectives. Also, the organic semiconductor layers of the OTFT are temperature sensitive and can be limited in functionality by a thermal treatment.

SUMMARY OF THE INVENTION

An aspect of an embodiment of the present invention is directed toward a method of manufacturing electrophoretic display (EPD) having an organic thin film transistor (OTFT) control circuit.

According an embodiment of the present invention, there is provided a method of manufacturing an electrophoretic display (EPD) having an organic thin film transistor thin film (OTFT) control circuit. The method includes: providing an EPD module including a plurality of EPD units on a common substrate, wherein each of the EPD units includes a cell having optical characteristic that can be capacitively switched; coating a plurality of pixel electrodes on a side of the EPD module; and preparing the OTFT control circuit by directly coating a plurality of OTFT layers on the side of the EPD module supporting the pixel electrodes.

In one embodiment, the preparing of the OTFT control circuit includes photolithograph coating at least one of a drain electrode, a source electrode, a gate electrode, or an organic semiconductor layer on the side of the EPD module supporting the pixel electrodes.

In one embodiment, the preparing of the OTFT control circuit includes inkjet coating at least one of a drain electrode, a source electrode, a gate electrode, or an organic semiconductor layer on the side of the EPD module supporting the pixel electrodes.

In one embodiment, the preparing of the OTFT control circuit includes photolithograph coating a drain electrode, a source electrode, a gate electrode, and an organic semiconductor layer on the side of the EPD module supporting the pixel electrodes.

In one embodiment, the preparing of the OTFT control circuit includes inkjet coating a drain electrode, a source electrode, a gate electrode, and an organic semiconductor layer on the side of the EPD module supporting the pixel electrodes.

In one embodiment, the preparing of the OTFT control circuit includes: applying a first insulating layer on at least one of the pixel electrodes, wherein the first insulating layer has a through hole; applying a drain electrode, a source electrode, and an organic semiconductor layer on the first insulating layer, wherein the organic semiconductor layer is between the drain electrode and the source electrode, and wherein at least one of the drain electrode or the source electrode is connected to the at least one of the pixel electrode via the through hole; applying a second insulating layer on the drain electrode, the source electrode, and the organic semiconductor layer; and applying a gate electrode on the second insulating layer.

In one embodiment, the preparing of the OTFT control circuit includes: applying a first insulating layer on at least one of the pixel electrodes, wherein the first insulating layer has a first through hole; applying a gate electrode on the first insulating layer; applying a second insulating layer on the gate electrode, wherein the second insulating layer has a second through hole; and applying a drain electrode, a source electrode, and an organic semiconductor layer on the second insulating layer, wherein the organic semiconductor layer is between the drain electrode and the source electrode, and wherein at least one of the drain electrode or the source electrode is connected to the at least one of the pixel electrode via the first and second through holes.

According to embodiments of the above-described method, conventional lamination of an EPD module and an OTFT module is not required.

In one embodiment, the method starts from an EPD module that substantially provides a substrate for an OTFT control circuit. The pixel electrodes are coated on the commercially available EPD module by using a suitable intermediate operation. Next, the OTFT control circuit is prepared step by step using a suitable method, i.e., sequentially forming layers directly on the EPD module. Here, the OTFT and the pixel electrodes contact each other, which is required for the OTFT control circuit. According to one embodiment of the method, conventional alignment of the EPD module and mechanisms for the alignment as well as laminating having its thermal intermediate operations and applying of adhesives are not required. Thus, according to an embodiment of the method, the method of manufacturing the EPD (and/or the EPD) can be simplified, thereby minimizing (or reducing) the amount of defective products and/or manufacturing costs.

According to another embodiment of the present invention, there is provided an EPD including an OTFT control circuit. The EPD includes: an EPD module including a plurality of EPD units on a substrate, wherein each of the EPD units includes a cell having optical characteristic that can be capacitively switched; a plurality of pixel electrodes coated on a side of the EPD module; and an OTFT layer of the OTFT control circuit directly coated on the side of the EPD module supporting the pixel electrodes.

In one embodiment, the OTFT layer of the OTFT control circuit includes at least one of a drain electrode, a source electrode, a gate electrode, or an organic semiconductor layer.

In one embodiment, the OTFT layer of the OTFT control circuit includes a plurality of OTFT layers.

In one embodiment, the plurality of OTFT layers include a drain electrode, a source electrode, a gate electrode, and an organic semiconductor layer.

In one embodiment, the plurality of OTFT layers include: a first insulating layer on at least one of the pixel electrodes, wherein the first insulating layer has a through hole; a drain electrode, a source electrode, and an organic semiconductor layer on the first insulating layer, wherein the organic semiconductor layer is between the drain electrode and the source electrode, and wherein at least one of the drain electrode or the source electrode is connected to the at least one of the pixel electrode via the through hole; a second insulating layer on the drain electrode, the source electrode, and the organic semiconductor layer; and a gate electrode on the second insulating layer.

In one embodiment, the plurality of OTFT layers include: a first insulating layer on at least one of the pixel electrodes, wherein the first insulating layer has a first through hole; a gate electrode on the first insulating layer; a second insulating layer on the gate electrode, wherein the second insulating layer has a second through hole; and a drain electrode, a source electrode, and an organic semiconductor layer on the second insulating layer, wherein the organic semiconductor layer is between the drain electrode and the source electrode, and wherein at least one of the drain electrode or the source electrode is connected to the at least one of the pixel electrode via the first and second through holes.

The EPD according to an embodiment of the present invention does not require a separate substrate for the OTFT control circuit and/or an adhesive layer. As such, the thickness of each layer constituting the EPD can be reduced, thereby increasing the flexibility of the EPD.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
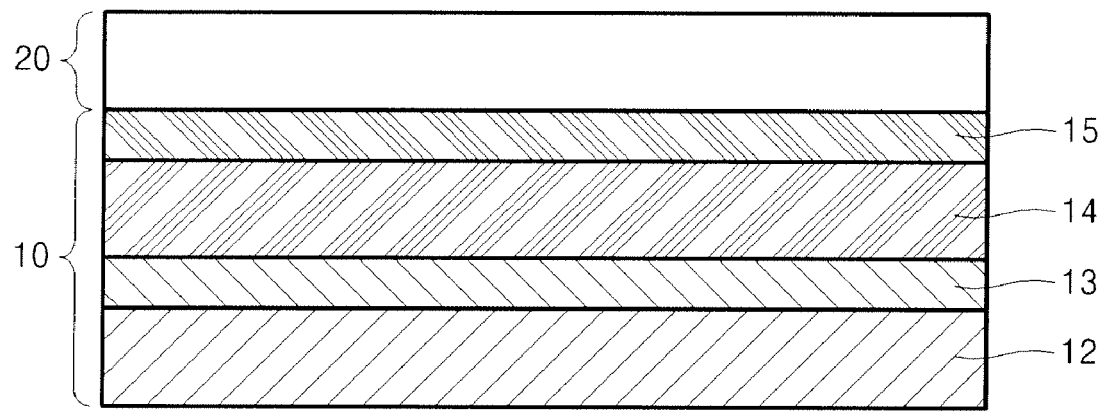
FIG. 1 is a schematic cross-sectional view of an electrophoretic display (EPD) according to an embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the another element or be indirectly on the another element with one or more intervening elements interposed therebetween. Like reference numerals designate like elements throughout the specification.

FIG. 1 is a schematic cross-sectional view of an electrophoretic display (EPD) according to an embodiment of the present invention. The EPD includes an EPD module 10 including a substrate 12, a backplate electrode 13, an EPD unit 14 and a protective layer 15. Here, in one embodiment, each EPD unit 14 includes a cell that is filled with a dispersion of charged particles in a solvent. The backplate electrode 13 is utilized to build up an electrical field and is connected to ground or a constant potential. Further, at least one pixel electrode is assigned to each cell (or pixel), wherein the cell is configured and arranged so that charged particles are aligned in the direction of the electrical field when applying a voltage. The pixel electrodes are coated on the protective layer 15 when manufacturing the EPD display. Also, the pixel electrodes should be configured differently in their dimension according to the desired display resolution. Here, certain functional elements of the EPD unit 14 as well as all other elements which are available in the EPD unit 14 are omitted in FIG. 1 for clearness. In addition, the EPD module 10 here may be used to form an image. In the current embodiment, at least one pixel electrode is assigned to each EPD unit of the EPD module 10, wherein the at least one pixel electrode can be switched using a suitable scheme as described above that is controlled. To achieve this, an organic thin film transistor (OTFT) control circuit 20 is arranged on the side of the EPD module 10 that supports the at least one pixel electrode.

The OTFT control circuit 20 includes a plurality of OTFT units. Each of the OTFT units includes one OTFT or a plurality of OTFTs. An OTFT includes an organic semiconductor layer as described above, and in addition, includes layers, functional elements, such as a drain, source and gate electrodes. One EPD unit 14 or, if necessary, a plurality of EPD units 14 are assigned to each OTFT unit. That is, one or a plurality of OTFTs of the OTFT unit are responsible for controlling the operation of one EPD unit 14 or the EPD units 14. To achieve this, at least one of the source electrode or the drain electrode of an OTFT of the OTFT unit is electrically connected to a pixel electrode. The pixel electrode may extend over the entire EPD units 14 or over only a part of the EPD unit 14. The size of the pixel electrode is determined according to the display resolution. For clarity, the graphical representation of the elements included in the OTFT control circuit 20 is omitted. Further, a method of manufacturing the OTFT control circuit 20 and the mode of the operation of the OTFT control circuit 20 are not described in more detail for convenience purposes.

Figure 2:
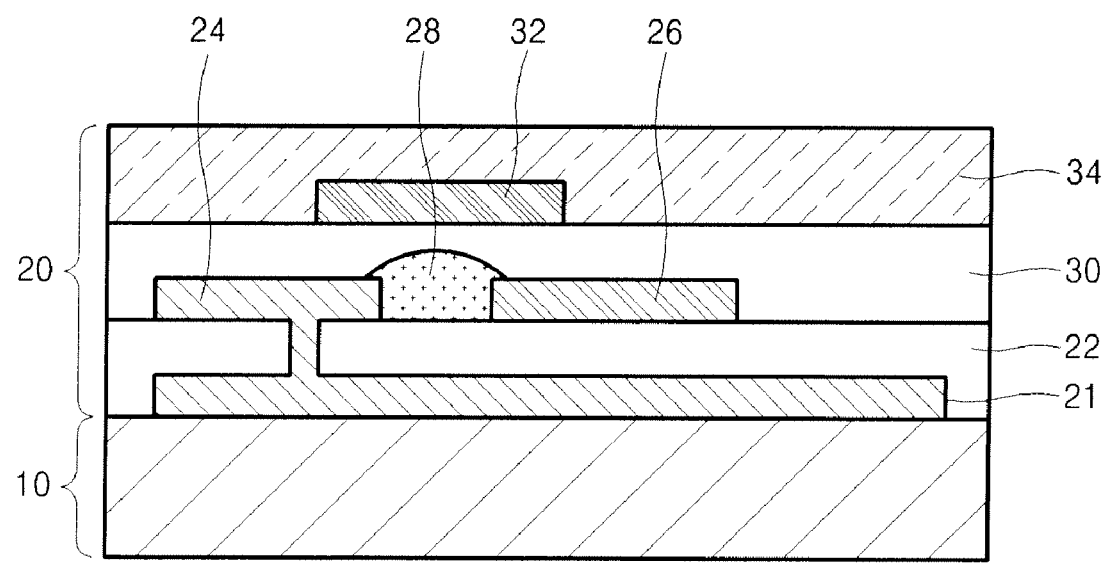
FIG. 2 is a schematic cross-sectional view of an EPD with a top gate configuration, according to another embodiment of the present invention.
Figure 3:
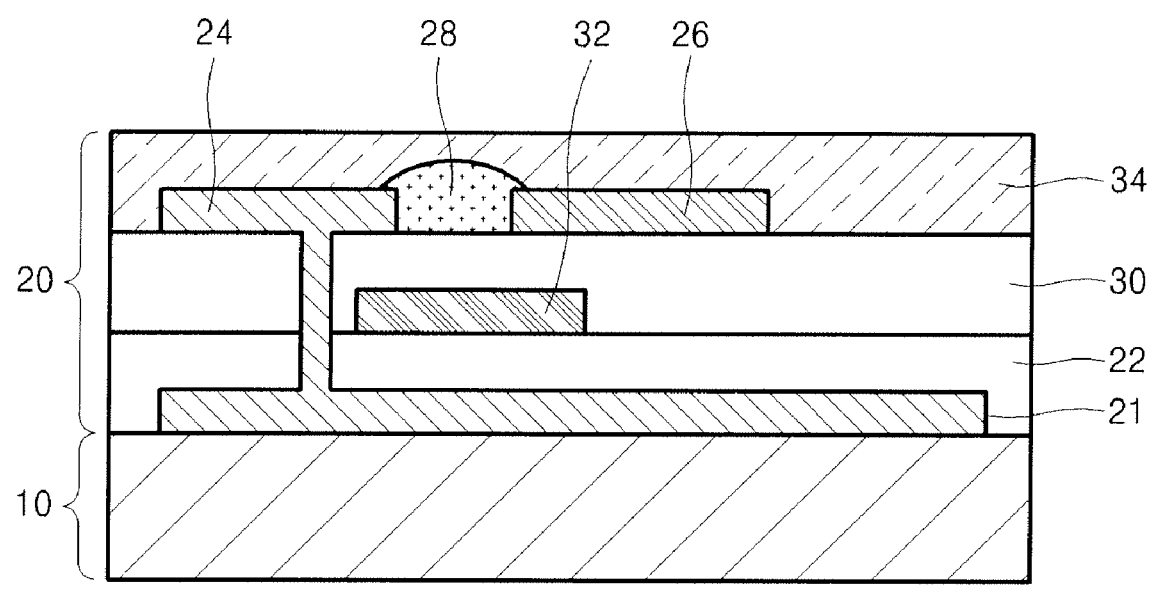
FIG. 3 is a schematic cross-sectional view of an EPD with a bottom gate configuration, according to another embodiment of the present invention.

FIGS. 2 and 3 are schematic cross-sectional views of configurations of a top gate and a bottom gate, respectively, according to embodiments of the present invention. In one embodiment, unlike a pixel electrode, the backplate electrode is not structured and extends over the whole of the EPD module.

FIG. 2 is a schematic cross-sectional view of an EPD including an OTFT control circuit 20, according to another embodiment of the present invention. Here, the OTFTs that are available in the OTFT control circuit 20 have a top gate configuration with respect to the EPD module 10. The EPD module 10 is covered with a pixel electrode 21. The pixel electrode 21 may be coated using photolithography, inkjet printing and/or other commercial printing technologies such as screen printing.

The OTFT control circuit 20 is formed as follows. Initially, an insulating layer 22 is coated on the pixel electrode 21. A through hole is formed through the insulating layer 22 by using selective etching. The through hole is filled with a conductive material by using inkjet printing in order to form a drain electrode 24 that contacts the pixel electrode 21. Parallel to this, a source electrode 26 is formed. Next, a semiconductor layer 28 may be inserted between the source electrode 26 and the drain electrode 24, e.g., by using inkjet printing. Then, the resulting structure is covered with another insulating layer 30. Next, a gate electrode 32 is coated, e.g., using inkjet printing, and then a suited protective layer 34 is coated on a side of the gate electrode 32. The insulating layer 22 is formed, e.g., using inkjet printing, so that etching is not needed. Alternatively, the insulating layer 22 may be configured using photolithography. The source electrode 26 and the drain electrode 24 as well as the through hole are formed, e.g., using inkjet printing and in a single process run. Alternatively, they may be formed using photolithography.

FIG. 3 is a schematic cross-sectional view of an EPD including an OTFT control circuit 20, according to another embodiment of the present invention. Here, the OTFTs that are available in the OTFT control circuit 20 have a bottom gate configuration with respect to the EPD module 10. All OTFT layers may be formed similarly to the method described with reference to FIG. 2.

In one embodiment, by virtue of photolithography, a higher display resolution can be obtained as compared to the case of inkjet printing. To display an image with high resolution, all processes may be performed using suitable photolithography as far as the EPD allows, and then the semiconductor layer 28 may be printed. Alternatively, the gate electrode 32 may also be printed.

The substrate 12 of the EPD module 10 may be formed of glass or synthetic material. In particular, the substrate 12 may be formed of polyethylene terephthalate (PET), polyethylene naphthalate (PEN), polyethersulfone (PES), aromatic polyesters, and/or polyimies (PI).

The pixel electrode 21 as well as the electrodes 24, 26 and 32 of the OTFT control circuit 20 may be formed of a material suitable for forming an electrode. For example, the material may be chromium, aluminum, tantalum, molybdenum, copper, silver, gold, palladium, indium, nickel and cobalt as well as alloys thereof. In one embodiment, a part of the electrodes 24, 26 and 32 or all electrodes 24, 26 and 32 are formed of a transparent material such as indium-tin-oxide (ITO). The pixel electrode 21 may be formed of a reflective material such as aluminum and silver. In one embodiment, the backplate electrode 13 in the EPD module 10 is transparent.

The semiconductor layer 28 may be formed of polymers such as poly(3-alkyl thiophene), poly(3-hexyl thiophene) (P3HT), poly(3-octyl thiophene), poly(2,5-thienylene vinylene) (PTV) or poly(paraphenylene vinylene) (PPV). Molecular organic semiconductor materials such as anthracene, pentacene, hexacene or tetracene may be used. Further, functionalized and soluble pentacene materials such as triisopropylsilyl (TIPS) and triisopropylsilyl (TMS) derivatives may be used.

The insulating layers 22 and 30 may be formed of an organic material such as polyolefines, polyacrylates, polyimides, polystyrene and polyisobutylenes. In addition, inorganic materials such as silicon dioxide, silicon nitride, aluminum oxide, tantalum oxide and the like may be used.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method of manufacturing an electrophoretic display (EPD) having an organic thin film transistor (OTFT) control circuit, the method comprising:
   providing an EPD module comprising a plurality of EPD units on a common substrate, wherein each of the EPD units includes a cell having optical characteristic that can be capacitively switched;
   coating a plurality of pixel electrodes on a side of the EPD module; and
   preparing the OTFT control circuit by directly coating a plurality of OTFT layers of the side of the EPD module supporting the pixel electrodes,
   wherein the preparing of the OTFT control circuit comprises:
   applying a first insulating layer on at least one of the pixel electrodes, wherein the first insulating layer has a through hole;
   applying a drain electrode, a source electrode, and an organic semiconductor layer on the first insulating layer, wherein the organic semiconductor layer is between the drain electrode and the source electrode, and wherein at least one of the drain electrode or the source electrode is connected to the at least one of the pixel electrodes via the through hole;
   applying a second insulating layer on the drain electrode, the source electrode, and the organic semiconductor layer; and
   applying a gate electrode on the second insulating layer.

2. The method of claim 1, wherein the preparing of the OTFT control circuit comprises photolithograph coating at least one of the drain electrode, the source electrode, the gate electrode, or the organic semiconductor layer on the side of the EPD module supporting the pixel electrodes.

3. The method of claim 1, wherein the preparing of the OTFT control circuit comprises inkjet coating at least one of the drain electrode, the source electrode, the gate electrode, or the organic semiconductor layer on the side of the EPD module supporting the pixel electrodes.

4. The method of claim 1, wherein the preparing of the OTFT control circuit comprises photolithograph coating the drain electrode, the source electrode, the gate electrode, and the organic semiconductor layer on the side of the EPD module supporting the pixel electrodes.

5. The method of claim 1, wherein the preparing of the OTFT control circuit comprises inkjet coating the drain electrode, the source electrode, the gate electrode, and the organic semiconductor layer on the side of the EPD module supporting the pixel electrodes.

6. A method of manufacturing an electrophoretic display (EPD) having an organic thin film transistor (OTFT) control circuit, the method comprising:
   providing an EPD module comprising a plurality of EPD units on a common substrate, wherein each of the EPD units includes a cell having optical characteristic that can be capacitively switched;
   coating a plurality of pixel electrodes on a side of the EPD module; and
   preparing the OTFT control circuit by directly coating a plurality of OTFT layers on the side of the EPD module supporting the pixel electrodes,
   wherein the preparing of the OTFT control circuit comprises:
   applying a first insulating layer on at least one of the pixel electrodes, wherein the first insulating layer has a first through hole;
   applying a gate electrode on the first insulating layer;
   applying a second insulating layer on the gate electrode, wherein the second insulating layer has a second through hole; and
   applying a drain electrode, a source electrode, and an organic semiconductor layer on the second insulating layer, wherein the organic semiconductor layer is between the drain electrode and the source electrode, and wherein at least one of the drain electrode or the source electrode is connected to the at least one of the pixel electrodes via the first and second through holes.

7. The method of claim 6, wherein the preparing of the OTFT control circuit comprises photolithograph coating at least one of the drain electrode, the source electrode, the gate electrode, or the organic semiconductor layer on the side of the EPD module supporting the pixel electrodes.

8. The method of claim 6, wherein the preparing of the OTFT control circuit comprises inkjet coating at least one of the drain electrode, the source electrode, the gate electrode, or the organic semiconductor layer on the side of the EPD module supporting the pixel electrodes.

9. The method of claim 6, wherein the preparing of the OTFT control circuit comprises photolithograph coating the drain electrode, the source electrode, the gate electrode, and the organic semiconductor layer on the side of the EPD module supporting the pixel electrodes.

10. The method of claim 6, wherein the preparing of the OTFT control circuit comprises inkjet coating the drain electrode, the source electrode, the gate electrode, and the organic semiconductor layer on the side of the EPD module supporting the pixel electrodes.

11. An electrophoretic display (EPD) including an organic thin film transistor (OTFT) control circuit, the EPD comprising:
an EPD module including a plurality of EPD units on a substrate, wherein each of the EPD units comprises a cell having optical characteristic that can be capacitively switched;
a plurality of pixel electrodes coated on a side of the EPD module; and
an OTFT layer of the OTFT control circuit directly coated on the side of the EPD module supporting the pixel electrodes,
wherein the OTFT layer of the OTFT control circuit comprises a plurality of OTFT layers,
wherein the plurality of OTFT layers comprise:
a first insulating layer on at least one of the pixel electrodes, wherein the first insulating layer has a through hole;
a drain electrode, a source electrode, and an organic semiconductor layer on the first insulating layer, wherein the organic semiconductor layer is between the drain electrode and the source electrode, and wherein at least one of the drain electrode or the source electrode is connected to the at least one of the pixel electrodes via the through hole;
a second insulating layer on the drain electrode, the source electrode, and the organic semiconductor layer; and
a gate electrode on the second insulating layer.

12. An electrophoretic display (EPD) including an organic thin film transistor (OTFT) control circuit, the EPD comprising:
an EPD module including a plurality of EPD units on a substrate, wherein each of the EPD units comprises a cell having optical characteristic that can be capacitively switched;
a plurality of pixel electrodes coated on a side of the EPD module; and
an OTFT layer of the OTFT control circuit directly coated on the side of the EPD module supporting the pixel electrodes,
wherein the OTFT layer of the OTFT control circuit comprises a plurality of OTFT layers,
wherein the plurality of OTFT layers comprises:
a first insulating layer on at least one of the pixel electrodes, wherein the first insulating layer has a first through hole;
a gate electrode on the first insulating layer;
a second insulating layer on the gate electrode, wherein the second insulating layer has a second through hole; and
a drain electrode, a source electrode, and an organic semiconductor layer on the second insulating layer, wherein the organic semiconductor layer is between the drain electrode and the source electrode, and wherein at least one of the drain electrode or the source electrode is connected to the at least one of the pixel electrodes via the first and second through holes.

13. An electrophoretic display (EPD) including an organic thin film transistor (OTFT) control circuit, the EPD comprising:
an EPD module including a plurality of EPD units on a substrate, wherein each of the EPD units comprises a cell having optical characteristic that can be capacitively switched;
a plurality of pixel electrodes on a side of the EPO module; and
a plurality of OTFT layers of the OTFT control circuit coated on the side of the EPD module supporting the pixel electrodes,
wherein the plurality of OTFT layers comprise:
a first insulating layer on at least one of the pixel electrodes, wherein the first insulating layer has a through hole;
a drain electrode, a source electrode, and an organic semiconductor layer on the first insulating layer, wherein the organic semiconductor layer is between the drain electrode and the source electrode, and wherein at least one of the drain electrode or the source electrode is connected to the at least one of the pixel electrodes via the through hole;
a second insulating layer on the drain electrode, the source electrode, and the organic semiconductor layer; and
a gate electrode on the second insulating layer.

14. An electrophoretic display (EPD) including an organic thin film transistor (OTFT) control circuit, the EPD comprising:
an EPD module including a plurality of EPD units on a substrate, wherein each of the EPD units comprises a cell having optical characteristic that can be capacitively switched;
a plurality of pixel electrodes on a side of the EPO module; and
a plurality of OTFT layers of the OTFT control circuit coated on the side of the EPD module supporting the pixel electrodes,
wherein the plurality of OTFT layers comprise:
a first insulating layer on at least one of the pixel electrodes, wherein the first insulating layer has a first through hole;
a gate electrode on the first insulating layer;
a second insulating layer on the gate electrode, wherein the second insulating layer has a second through hole; and
a drain electrode, a source electrode, and an organic semiconductor layer on the second insulating layer, wherein the organic semiconductor layer is between the drain electrode and the source electrode, and wherein at least one of the drain electrode or the source electrode is connected to the at least one of the pixel electrodes via the first and second through holes.

* * * * *

UNITED STATES PATENT AND TRADEMARK OFFICE
CERTIFICATE OF CORRECTION

| | | |
|---|---|---|
| PATENT NO. | : 7,777,939 B2 | Page 1 of 1 |
| APPLICATION NO. | : 12/038614 | |
| DATED | : August 17, 2010 | |
| INVENTOR(S) | : Arthur Mathea et al. | |

It is certified that error appears in the above-identified patent and that said Letters Patent is hereby corrected as shown below:

In the Claims

Column 7, Claim 1, line 54          Delete "layers of the side" Insert -- layers on the side --

Signed and Sealed this

Thirteenth Day of December, 2011

David J. Kappos
*Director of the United States Patent and Trademark Office*